(12) United States Patent
Keidar et al.

(10) Patent No.: US 8,060,119 B2
(45) Date of Patent: Nov. 15, 2011

(54) ADAPTIVE WAKE-UP PERIOD OF ROAMING WIRELESS TERMINALS

(75) Inventors: Ron Keidar, Haifa (IL); Alejandro R. Holcman, San Diego, CA (US); Kirk A. Burroughs, Alamo, CA (US); Liron Manor, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 1266 days.

(21) Appl. No.: 11/504,237

(22) Filed: Aug. 14, 2006

(65) Prior Publication Data
US 2007/0127425 A1    Jun. 7, 2007

Related U.S. Application Data

(60) Provisional application No. 60/708,649, filed on Aug. 15, 2005, provisional application No. 60/748,731, filed on Dec. 8, 2005.

(51) Int. Cl.
*H04L 12/56* (2006.01)
*H04W 28/06* (2009.01)
*H04W 24/00* (2009.01)

(52) U.S. Cl. ............... 455/458; 455/435.2; 455/515; 370/329

(58) Field of Classification Search .......... 455/4, 5; 370/3
See application file for complete search history.

(56) References Cited

U.S. PATENT DOCUMENTS

| | | | |
|---|---|---|---|
| 6,009,086 A | 12/1999 | Freeburg et al. | |
| 6,480,476 B1 * | 11/2002 | Willars | 370/311 |
| 6,570,856 B1 | 5/2003 | Freeburg et al. | |
| 6,590,886 B1 * | 7/2003 | Easton et al. | 370/342 |
| 6,675,015 B1 * | 1/2004 | Martini et al. | 455/436 |
| 6,829,493 B1 * | 12/2004 | Hunzinger | 455/574 |
| 6,999,729 B2 | 2/2006 | Wandel | |
| 7,292,551 B2 * | 11/2007 | Lim et al. | 370/332 |
| 7,526,288 B2 * | 4/2009 | Eom et al. | 455/435.1 |
| 2003/0185170 A1 * | 10/2003 | Allen et al. | 370/329 |
| 2004/0023634 A1 | 2/2004 | Jeong et al. | |
| 2004/0043798 A1 | 3/2004 | Amerga et al. | |

(Continued)

FOREIGN PATENT DOCUMENTS

EP    1191807 A2    3/2002

(Continued)

OTHER PUBLICATIONS

International Search Report and Written Opinion—PCT/US2006/031983, International Search Authority—European Patent Office—Jan. 15, 2007.
Translation of Office Action in Japanese application 2008-527103 corresponding to U.S. Appl. No. 11/504,237.

(Continued)

*Primary Examiner* — Rafael Pérez-Gutiérrez
*Assistant Examiner* — Frank Donado
(74) *Attorney, Agent, or Firm* — James McFarland; Mary Fales

(57) ABSTRACT

A method for controlling a wireless terminal operating in a hibernation cycle alternating between a wake mode and a hibernation mode includes communicating with a first wireless network during a first waking period having a first duration, and with a second wireless network during a second waking period following the first waking period. The second waking period is extended to a second duration, greater than the first duration, responsively to detecting that the second wireless network is different from the first wireless network. Network information relating to the second wireless network is received during the second waking period.

13 Claims, 2 Drawing Sheets

U.S. PATENT DOCUMENTS

| | | | |
|---|---|---|---|
| 2004/0105401 A1* | 6/2004 | Lee | 370/311 |
| 2004/0166895 A1* | 8/2004 | Koenck et al. | 455/556.1 |
| 2004/0185820 A1* | 9/2004 | Ogura | 455/343.1 |
| 2004/0248573 A1 | 12/2004 | Wandel | |
| 2004/0253952 A1* | 12/2004 | Rager et al. | 455/432.1 |
| 2005/0034001 A1* | 2/2005 | Pontarelli | 713/320 |
| 2005/0037746 A1* | 2/2005 | Ramalho et al. | 455/422.1 |
| 2005/0049013 A1* | 3/2005 | Chang et al. | 455/574 |
| 2005/0128990 A1* | 6/2005 | Eom et al. | 370/338 |
| 2005/0136930 A1* | 6/2005 | Dent | 455/445 |
| 2006/0153139 A1* | 7/2006 | Bae et al. | 370/335 |

FOREIGN PATENT DOCUMENTS

| | | |
|---|---|---|
| JP | 2003158762 | 5/2003 |
| JP | 2004112148 | 4/2004 |
| WO | WO9960801 | 11/1999 |
| WO | WO0022837 | 4/2000 |
| WO | WO03105519 | 12/2003 |
| WO | WO2004015877 | 2/2004 |

\* cited by examiner

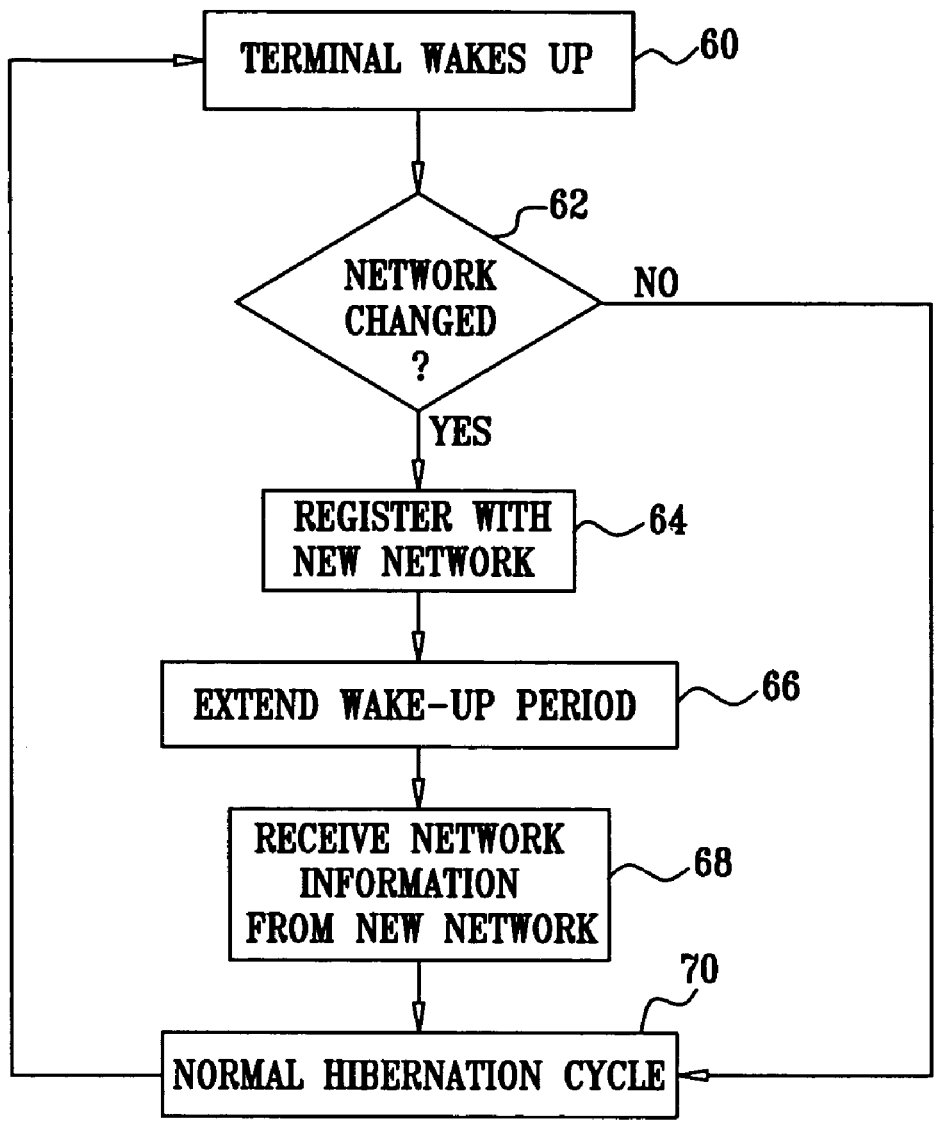

ADAPTIVE WAKE-UP PERIOD OF ROAMING WIRELESS TERMINALS

RELATED APPLICATIONS

This application claims priority to U.S. Provisional Application No. 60/708,649, filed on Aug. 15, 2005, and U.S. Provisional Application No. 60/748,731, filed on Dec. 8, 2005.

FIELD OF THE INVENTION

The present invention relates generally to wireless communication, and particularly to methods and systems for controlling the wake-up period of wireless terminals that use hibernation protocols.

BACKGROUND

In some wireless communication applications, mobile wireless terminals alternate between a hibernation mode and a wake mode. In one typical example, the hibernation mode is substantially longer than the wake mode. Accordingly, networks that support such devices are referred to as a low duty cycle (LDC) networks, and the mobile terminals that operate in such networks are referred to as LDC terminals. LDC terminals are small-size communication devices used in a variety of position tracking, tagging, telemetry and similar applications. LDC terminals operate such that each terminal wakes-up to receive and transmit data for only a small percentage of the time. This low duty cycle operation minimizes the utilization of the air interface and the energy consumption from the terminal's power source.

SUMMARY

In some applications, wireless terminals have the ability to move (roam) between different wireless networks. In particular, a wireless terminal operating in a hibernation cycle sometimes wakes-up, registers with the network and begins communicating with a wireless network other than the network it had communicated with in the previous wake-up period.

In some embodiments, registration with a network other than the network most recently used triggers transmission from the new network to the wireless terminal of additional network information that would not be transmitted in consecutive registration procedures within the same network. The addition of this information to the communication between the terminal and the network requires more time. In order to enable the terminal to receive this network information, it is sometimes desirable to extend the length of the wake-up period of the terminal.

Embodiments of the disclosed method and apparatus control wireless terminals roaming from one wireless network to another. In some embodiments, a control module in the terminal detects that the current network is different from the network to which the terminal communicated in the previous wake-up period. If it is determined that the network to which the terminal is communicating in the current wake mode is not the same network to which the terminal was communicating in the previous wake mode, the control module extends the length of the wake mode to ensure that all of the desired data can be communicated before the end of the wake mode.

In some embodiments, the terminal monitors overhead messages broadcast by the wireless network. The overhead messages typically comprise a network identification (NID) number and/or a server identification (SID) number. In these embodiments, the terminal compares the NID and/or SID numbers with previously stored values to determine whether or not the network has changed.

In some embodiments, the terminal may, during the extended wake-up period, receive network information regarding the new network it has joined, such as an address of an application server with which the terminal is to communicate.

A wireless terminal and a wireless communication system that implements these control methods are also disclosed.

There is, therefore, disclosed a method for controlling a wireless terminal operating in a hibernation cycle alternating between a wake mode and a hibernation mode, including: communicating with a first wireless network during a first waking period having a first duration; communicating with a second wireless network during a second waking period following the first waking period; extending the second waking period to a second duration greater than the first duration responsively to detecting that the second wireless network is different from the first wireless network; and receiving network information relating to the second wireless network during the second waking period.

In an embodiment, the wireless terminal includes a low duty-cycle (LDC) terminal in an LDC network, and communicating with the first and second wireless networks includes applying an LDC service.

In another embodiment, one of the first and second wireless networks includes a home network of the wireless terminal, and the other of the first and second networks includes a foreign network with respect to the wireless terminal. In an alternative embodiment, the first and second wireless networks include foreign networks with respect to the wireless terminal.

In yet another embodiment, communicating with the first and second wireless networks includes registering with the respective wireless network.

In still another embodiment, detecting that the second wireless network is different from the first wireless network includes receiving a first identification (ID) number from the first wireless network during the first waking period, receiving a second ID number from the second wireless network during the second waking period, and detecting that the first ID number is different from the second ID number.

In an embodiment, receiving the network information includes receiving a dedicated message including an address in the second wireless network with which the terminal is to communicate.

Also disclosed is a wireless terminal, including: a transmitter configured to transmit information to first and second wireless networks; a receiver configured to receive information from the first and second wireless networks; and a control module configured to control the transmitter and receiver in a hibernation cycle alternating between a wake mode and a hibernation mode so as to communicate with the first wireless network during a first waking period having a first duration, to communicate with the second wireless network during a second waking period following the first waking period, to extend the second waking period to a second duration greater than the first duration responsively to detecting that the second wireless network is different from the first wireless network, and to receive network information relating to the second wireless network during the second waking period.

The disclosed method and apparatus will be more fully understood from the following detailed description of the embodiments thereof, taken together with the drawings.

BRIEF DESCRIPTION OF THE DRAWINGS

FIG. 2 is a flow chart that schematically illustrates a method for controlling a wake-up period of a wireless terminal, in accordance with an embodiment of the disclosed method and apparatus.

DETAILED DESCRIPTION OF EMBODIMENTS

Figure 1:
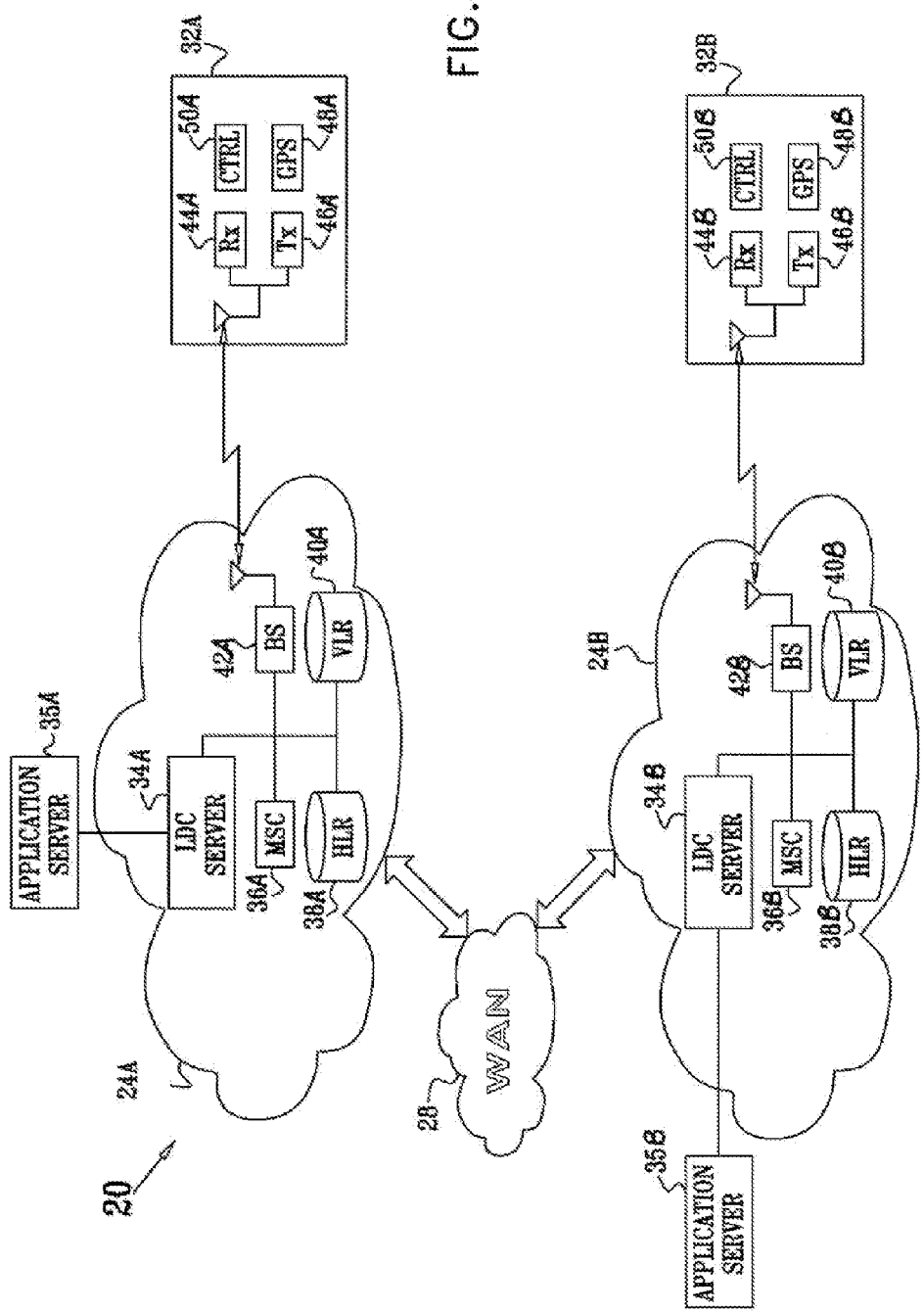
FIG. 1 is a block diagram that schematically illustrates a wireless communication system, in accordance with an embodiment of the disclosed method and apparatus.

FIG. 1 is a block diagram that schematically illustrates a wireless low duty-cycle (LDC) communication system 20, in accordance with an embodiment of the disclosed method and apparatus. The LDC system 20 may operate as part of a conventional wireless network comprising, for example, a cellular network, a personal communication system (PCS) or any other suitable public or private wireless network. Different embodiments of the LDC system 20 can be adapted to use any wireless standard, protocol or air interface used by the conventional wireless network, such as cdmaOne, CDMA2000, 1xEVDO, UMTS, GSM or any other suitable standard. As such, the LDC system 20 can be adapted to operate on any frequency band being used by a conventional wireless network.

In the embodiment of FIG. 1, the system 20 comprises two wireless networks 24, denoted 24A and 24B. The two networks are interconnected by a wide-area network (WAN) 28, such as the Internet. Each wireless network 24 communicates with wireless terminals 32. In the present example, two terminals are denoted 32A and 32B. Communication is performed via wireless base stations 42, denoted 42A and 42B, which serve as wireless access points to each network 24. In some embodiments, each wireless network 24 covers a certain geographical area, which may or may not overlap with coverage areas of other wireless networks (not shown).

Downlink messages transmitted using radio signals transmitted from the base station 42 to the terminal 32 are received, downconverted, filtered, demodulated and otherwise processed by a receiver 44. Uplink messages transmitted from the terminal 32 to the base station 42 are modulated, upconverted, filtered and amplified by a transmitter 46 to produce an uplink signal. The uplink signal is then transmitted to the base station 42.

Some LDC applications (such as tracking applications for tracking people, pets and property) make use of the position of the LDC terminal. In some embodiments, the terminal 32 uses a position sensor, such as a global positioning system (GPS) receiver 48, to determine the position of the terminal 32. The terminal 32 transmits this information to the base station 42. In some cases, the terminal 32 receives and/or transmits information after it leaves the service area of one wireless network 24A and enters the service area of another network 24B, as will be described below.

A control module 50 in the terminal 32 performs all control and management functions of the LDC terminal 32. In accordance with one embodiment of the disclosed method and apparatus, the terminal 32 operates in half duplex mode. Accordingly, the terminal 32 cannot transmit and receive at the same time. Therefore, among other functions, the control module 50 causes the terminal 32 to alternate between transmit and receive modes. The control module 50 also causes the terminal 32 to alternate between a wake mode and a hibernation mode, in accordance with a hibernation cycle synchronized between the terminal 32 and a base station 42 to which the terminal 32 is communicating. It should be noted that both the transmit mode and receive mode occur during the wake mode. In accordance with one embodiment of the disclosed method and apparatus, transmitting or receiving do not occur during the hibernation mode.

Generally, when in hibernation mode, most of the terminal's hardware functions are shut down to conserve battery power. In some embodiments, some of the hardware itself may also be shut down during hibernation mode, leaving only the hardware necessary for time-keeping and for waking the terminal at the next wake-up period. The time between consecutive wake-up periods (i.e., duration of the hibernation mode) can typically take any value from several minutes (or less) to several weeks (or even longer), depending on the application.

In particular, the control module 50 adapts the duration during which the terminal 32 is awake (referred to as a "wake-up period") in response to the roaming status of the terminal 32. The method of adaptation is explained in detail below. The control module 50 may be implemented using hardware, such as digital circuitry implemented using discrete components or within an integrated circuit (IC). Alternatively, the control module 50 can be implemented using software running on a microprocessor or using a combination of hardware and software elements.

In the embodiment of FIG. 1, each wireless network 24A and 24B comprises an LDC server 34. The LDC server 34 performs various management functions associated with terminals 32 used in the network 24. An application server 35 (separate and unique from the LDC server 34) runs the specific LDC application. For example, the application server 35 may comprise a web-server that displays the position of terminals 32 on a map and/or provides users of the application with certain control functions over the terminals 32. The application server 35 may be located either inside or outside of the wireless network 24. Typically, the application server 35 is the source of downlink messages transmitted to the terminals 32 in the wireless network 24, and is the destination of uplink messages transmitted from the terminals 32 to the wireless network 24.

The communication of each wireless network 24 with its terminals 32 is managed by a mobile switching center (MSC) 36. Each MSC performs all switching and routing functions of messages to and from terminals 32 in its wireless network. Typically, when a the terminal 32 joins one of the wireless networks 24, it performs a registration procedure with the MSC of this network 24. For each terminal 32, one of the wireless networks 24 is defined as its home network, although the terminal 32 may generally register and communicate with any wireless network in the system 20. A terminal communicating with a wireless network different from its home network (sometimes called a "foreign network") is referred to as a "roaming" or "visiting" terminal. A terminal communicating with its home network is referred to as a "local" terminal.

In accordance with one embodiment, each wireless network 24 includes two databases, namely a home location register (HLR) 38 and a visitor location register (VLR) 40. Each HLR 38 keeps information related to all terminals 32 for which the specific wireless network 24 is the home network. At any given time, some of these terminals 32 may be registered with the home network, some may be turned off and others may be roaming (i.e., registered with a foreign wireless network). Each VLR 40 keeps information related to the roaming terminals that are currently registered with its wireless network 24. When a terminal 32 moves from one wireless network 24 to another, relevant routing information is sent to the HLR of the terminal's home network, so as to enable downlink messages to be routed to it. When a terminal 32 registers with a foreign network, the VLR 40 of the foreign network is updated with routing information with respect to the home network.

Although the exemplary configuration of FIG. 1 shows two wireless networks 24A and 24B, the system 20 in general may comprise any number of wireless networks 24. Additionally or alternatively, each wireless network 24 typically comprises a plurality of base stations 42 and may comprise more than one MSC 35.

In a typical transaction in which a downlink message is sent to a destination terminal 32A, an application server 35A in the destination terminal's home network 24A sends a message addressed to the terminal 32A. The destination terminal 32A may be registered with its home network 24A or it may be roaming. In the case in which the destination terminal 32A is not roaming, the application server 35A provides the downlink message to the LDC server 34A, which in turn sends it to the MSC 36A within its wireless network 24A. The MSC 36A determines, by querying its HLR, the appropriate routing information, and routes the downlink message to the destination terminal 32A. If, however, the destination terminal 32A is roaming in the network 24A, the routing path goes through the local MSC 36B (assuming that network 24B is the home of destination terminal 32A), to the foreign MSC 36A via WAN 28, and from there to the destination terminal 32A.

In a typical uplink transaction, a source terminal 32A initiates an unsolicited uplink message addressed to its home network application server 35A (assuming the source terminal 32A is not roaming). If the source terminal 32A is currently registered with its home network, the uplink message is routed via the local MSC 36A and the LDC server 34A to the application server 35A. If, on the other hand, the source terminal 32A is registered with a foreign network 24A, the MSC 36A of the foreign network 24A receives the uplink message, queries its VLR 40A for the appropriate routing information to the source terminal's home network 24B, for example, and routes the uplink message from the foreign MSC 36A via the WAN 28 to the MSC 36B of the terminal's home network 24B and from there, via the LDC server 34B of the home network to the application server 35B.

In general, when a terminal 32A initiates communication with a wireless network 24A, it first performs a registration procedure with this network 24A. In some embodiments, the terminal 32A periodically renews its registration with the wireless network 24A, in accordance with a predetermined registration time-out. In such cases, when the terminal 32A wakes-up from hibernation, it checks whether or not the registration time-out has expired. If expired, the terminal 32A re-registers with the network 24A and resets the time-out. Certain events, referred to as "implicit registrations," are sometimes considered as registrations for the purpose of resetting the registration time-out. For example, if the terminal 32A sets up a traffic channel with the wireless network 24A, this event is counted as an implicit registration. Communicating via a common channel, such as using short message service (SMS) messages, is typically not considered a registration. In alternative embodiments, the terminal 32A registers with the wireless network 24A each time it wakes-up from hibernation.

In some embodiments, after the terminal 32A wakes-up, it monitors overhead messages broadcasted by the wireless network 24A it intends to communicate with. The overhead messages typically comprise a network identification (NID) number identifying the wireless network and/or a system identification (SID) number identifying the MSC 36A.

When a terminal first wakes-up after moving from one wireless network 24B to another network 24A, the terminal 32A decodes the NID and/or SID numbers from the overhead messages and compares them to previously-stored SID and/or NID values. If a change is detected in these parameters, the terminal 32A realizes it moved to a new network 24A and initiates a registration procedure with the new network 24A. Registration with a new network 24A typically disregards the status of the registration time-out described above.

In some embodiments, there is a hierarchy between NID and SID such that NID is a subset of SID. In these cases, the terminal 32A concludes that it is in a new network 24A when either the SID has changed (regardless of the NID value) or when both NID and SID have changed.

In some embodiments, in response to the registration procedure with the new network 24A, application server 35A sends the terminal 32A network information regarding the LDC network 24A it has joined. For example, in some embodiments the network information comprises a dedicated downlink message comprising a new address for sending uplink LDC messages, such as the address of the relevant application Server 35A. Additionally or alternatively, the application server 35A and/or LDC server 34A may send any other network information to the terminal 32A upon its registration with a new network 24A.

Because additional network information is sent from the application server 35A, the registration procedure with a newly-joined network 24A typically involves the transfer of more data than is the case with consecutive registration procedures within the same network 24B. For this reason, when the terminal 32A wakes-up and registers with a new wireless network 24A (i.e., a network 24A different from the network 24B it registered with in the previous wake-up period), the control module 50A extends the length of the wake-up period of the terminal 32A, to allow for the additional data to be transferred.

In typical applications, the nominal duration of the wake-up period is on the order of 10-30 ms. When joining a new network, it is desirable for the duration of the wake-up period to be typically doubled or tripled.

FIG. 2 is a flow chart that schematically illustrates a method for controlling the wake-up period of a terminal 32, in accordance with an embodiment of the disclosed method and apparatus. The method begins with the terminal 32A operating in a synchronized hibernation cycle, as described above. At the appropriate time, the control module 50A wakes up the receiver 44A, the transmitter 46A and/or other components of the terminal 32A, at a wake-up step 60.

After waking up, the control module 50 checks whether the current wireless network 24A with which the terminal 32A intends to communicate is the same or different from the wireless network 24B with which it communicated in the previous wake-up period. This occurs at a network change checking step 62. In some embodiments, the terminal 32A monitors the overhead messages broadcasted by the wireless network 24A and decodes the SID and/or NID numbers from these overhead messages. The control module 50A then compares the decoded SID and/or NID identification numbers with the identification number or numbers received in the previous wake-up period. A change in these numbers may indicate a change of network. Alternatively, any other suitable mechanism can be used by the terminal 32A for this purpose.

If the control module 50A concludes that the current wireless network 24A is the same as in the network detected in the previous wake-up period, it continues the normal wake-up/hibernation cycle, at a normal hibernation step 70. At hibernation step 70 and as part of the normal hibernation cycle, the terminal 32A may renew its registration with the wireless network 24A, as explained above. The control module 50A wakes up the terminal 32A at the next wake-up period and the method returns to wake-up step 60 above.

If, on the other hand, the control module 50A concludes that the current wireless network 24A is different from the network 24B previously detected in the previous wake-up period, the terminal 32A registers with the new network 24A at a new registration step 64.

In response to the registration with the new network 24A, the application server 35A sends a dedicated downlink message to the terminal 32A, as described above. In order to allow for the additional data transfer required for receiving this message, the control module 50A extends the length of the wake-up period, at an extension step 66.

During the extended wake-up period, the receiver 44A of the terminal 32A receives downlink data sent to it from the base station 42A, at a communication step 68. In some embodiments, the downlink data comprises the dedicated downlink message carrying the additional network information regarding the new LDC network 24A. In addition to receiving the downlink data, the terminal 32A may perform any additional communication with the new network 24A through the base station 42A during the extended wake-up period. These additional communication functions typically depend on the specific functionality of the LDC service carried out by the system 20, and are outside the scope of the present patent application.

Having completed the communication functions for the present wake-up period, the terminal 32A returns to hibernation mode in accordance with the normal hibernation cycle, at a hibernation step 70. The length of the wake-up period is reset to the default value assuming no network change. When the time comes for the terminal to wake up again, the method returns to wake-up step 60 above.

Although the methods and systems described herein relate mainly to controlling the wake-up period of LDC terminals, these methods and systems can also be used to control wake-up periods in other types of wireless terminals that operate in a hibernation cycle. Such terminals may include, for example, pagers, cellular telephones, telemetry transponders and radio-frequency identification (RFID) transponders.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for controlling a wireless terminal, the method comprising:
   a) transitioning from a hibernation mode to a wake mode;
   b) communicating with a first wireless network during a first waking period having a first duration;
   c) communicating with a second wireless network during a second waking period following the first waking period;
   d) detecting that the second wireless network is different from the first wireless network; and
   e) extending the second waking period to a second duration greater than the first duration in response to detecting that the second wireless network is different from the first wireless network.

2. The method of claim 1, further comprising receiving network information relating to the second wireless network during the second waking period.

3. The method of claim 2, wherein the act of receiving the network information comprises receiving a dedicated message comprising an address in the second wireless network with which the wireless terminal is to communicate.

4. The method of claim 1, wherein the wireless terminal comprises a low duty-cycle (LDC) terminal in an LDC network, and wherein the acts of communicating with the first and second wireless networks comprises applying an LDC service.

5. The method of claim 1, wherein 1 the acts of communicating with the first and second wireless networks comprises registering with the second wireless network.

6. The method of claim 1, wherein the act of detecting that the second wireless network is different from the first wireless network comprises:
   a) receiving a first identification (ID) number from the first wireless network during the first waking period;
   b) receiving a second ID number from the second wireless network during the second waking period; and
   c) detecting that the first ID number is different from the second ID number.

7. A wireless terminal comprising:
   a) a transmitter configured to transmit information to first and second wireless networks;
   b) a receiver configured to receive information from the first and second wireless networks; and
   c) a control module configured to control the transmitter and the receiver to:
      i) alternate between a wake mode and a hibernation mode so as to communicate with the first wireless network during a first waking period having a first duration,
      ii) communicate with the second wireless network during a second waking period following the first waking period,
      iii) detect that the second wireless network is different from the first wireless network; and
      iv) extend the second waking period to a second duration greater than the first duration in response to detecting that the second wireless network is different from the first wireless network.

8. The wireless terminal of claim 7, wherein the controller is further configured to control the receiver to receive network information relating to the second wireless network during the second waking period.

9. The wireless terminal of claim 7, wherein the wireless terminal and the first and second wireless networks comprise a low duty-cycle (LDC) network.

10. The wireless terminal, of claim 7, wherein the control module is further configured to operate the transmitter and the receiver so as to register with the first and second wireless networks in order to communicate with the first and second wireless networks, respectively.

11. The wireless terminal of claim 7, wherein the control module is further configured to:
   a) receive through the receiver a first identification (ID) number from the first wireless network during the first waking period;
   b) receive through the receiver a second ID number from the second wireless network during the second waking period; and
   c) detect that the second wireless network is different from the first wireless network by detecting that the first ID number is different from the second ID number.

12. The wireless terminal of claim 7, wherein the received information comprises a dedicated downlink message comprising an address in the second wireless network with which the wireless terminal is to communicate.

13. A wireless terminal comprising:
a) means for transitioning between a hibernation mode and a wake mode;
b) means for communicating with a first wireless network during a first waking period having a first duration;
c) means for communicating with a second wireless network during a second waking period following the first waking period;
d) means for detecting that the second wireless network is different from the first wireless network; and
e) means for extending the second waking period to a second duration greater than the first duration in response to detecting that the second wireless network is different from the first wireless network.

\* \* \* \* \*